(12) United States Patent
Shiraishi et al.

(10) Patent No.: US 9,716,693 B2
(45) Date of Patent: Jul. 25, 2017

(54) DIGITAL RIGHTS MANAGEMENT FOR EMAILS AND ATTACHMENTS

(71) Applicant: KONICA MINOLTA LABORATORY U.S.A., INC., San Mateo, CA (US)

(72) Inventors: Kyohei Shiraishi, San Mateo, CA (US); Rabindra Pathak, San Jose, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/543,871

(22) Filed: Nov. 17, 2014

(65) Prior Publication Data

US 2016/0142381 A1 May 19, 2016

(51) Int. Cl.
*H04L 29/06* (2006.01)
*G06F 21/10* (2013.01)

(52) U.S. Cl.
CPC .......... *H04L 63/0428* (2013.01); *G06F 21/10* (2013.01); *H04L 63/20* (2013.01); *G06F 2221/0724* (2013.01); *H04L 2463/101* (2013.01)

(58) Field of Classification Search
CPC ............................ H04L 63/0428; H04L 63/20
See application file for complete search history.

(56) References Cited

U.S. PATENT DOCUMENTS

| 7,454,778 B2* | 11/2008 | Pearson | H04L 12/585 726/1 |
| 7,949,355 B2* | 5/2011 | Brown | H04L 51/38 345/472 |
| 7,966,375 B2* | 6/2011 | Steele | H04L 12/585 709/206 |
| 2003/0237005 A1* | 12/2003 | Bar-Or | H04L 63/0435 726/10 |

(Continued)

OTHER PUBLICATIONS

Adobe Systems Incorporated, "Adobe LiveCycle ES3 Overview: Rights Management", http://help.adobe.com/en_US/livecycle/10.0/Overview/WS92d06802076abadb2c8525912ddcb9aad9-7ff8.html, 7 pages, printed from the internet on Apr. 15, 2014.

(Continued)

*Primary Examiner* — Theodore C. Parsons
*Assistant Examiner* — Thomas Ho
(74) *Attorney, Agent, or Firm* — Chen Yoshimura LLP

(57) ABSTRACT

A digital rights management (DRM) method for protecting emails can apply different protection policies to different components of an email such as the message body and the attached digital files. While an email application of the client encrypts the entire email document including both the message and the attachments, a plugin module on the client obtains user input regarding the DRM policies to be applied to individual attachments and then transmits the encrypted email along with the information about the DRM policies for the individual attachments to a digital rights management server. The server first decrypts the entire email document, (Continued)

then applies the user-specified DRM policies to the attachments individually. The server re-composes an email and attaches the individually protected attachments, and transmits the email to the exchange server.

14 Claims, 2 Drawing Sheets

(56) References Cited

U.S. PATENT DOCUMENTS

| | | | |
|---|---|---|---|
| 2007/0204078 A1* | 8/2007 | Boccon-Gibod | G06F 21/10 710/54 |
| 2008/0086779 A1* | 4/2008 | Blake | G06F 21/10 726/27 |
| 2008/0189213 A1* | 8/2008 | Blake | G06F 21/10 705/59 |
| 2010/0082448 A1* | 4/2010 | Lin | G06F 21/10 705/26.1 |
| 2011/0141974 A1* | 6/2011 | Lieberman | H04L 12/5895 370/328 |
| 2015/0149774 A1* | 5/2015 | Taima | H04L 63/0428 713/168 |

OTHER PUBLICATIONS

Adobe Systems Incorporated, "Programmatically applying policies", http://help.adobe.com/en_US/livecycle/10.0/ Overview/WSb96e41f8a4ca47a9-4882aeb5131190eddba-8000.html, 1 page, printed from the internet on Apr. 9, 2014.

Adobe Systems Incorporated, "LiveCycle® ES Java™ API Reference", http://livedocs.adobe.com/livecycle/es/sdkHelp/programmer/javadoc/index.html, 3 pages, printed from the internet on Apr. 9, 2014.

Microsoft, "Active Directory Rights Management Services", http://technet.microsoft.com/en-us/windowsserver/dd448611.aspx, 2 pages, printed from the internet on Nov. 10, 2014.

Microsoft, "AD RMS Overview", http://msdn.microsoft.com/library/cc530389(VS.85).aspx, 6 pages, printed from the internet on Nov. 10, 2014.

Microsoft, "Using the AD RMS SDK", http://msdn.microsoft.com/en-us/library/cc542552(v=vs.85).aspx, 1 page, printed from the internet on Nov. 10, 2014.

Microsoft, "AD RMS Documentation Roadmap", http://technet.microsoft.com/en-us/library/dd772711.aspx, 3 pages, printed from the internet on Nov. 10, 2014.

* cited by examiner

DIGITAL RIGHTS MANAGEMENT FOR EMAILS AND ATTACHMENTS

BACKGROUND OF THE INVENTION

Field of the Invention

This invention relates to digital rights management for emails (electronic mails), and in particular, it relates to a method for applying digital rights management policies to MIME format emails including its attachments.

Description of Related Art

With the wide use of digital documents and digital document processing, digital rights management systems ("DRM" or "RMS") are increasingly implemented to control user access to and prevent unauthorized use of digital documents. The rights involved in using a digital document may include the right to view (or "read"), edit (or "write"), print, or copy the digital document, the right to transmit the document by email, etc. A user may access a digital document by acquiring or being assigned one or more of these rights. DRM systems are generally implemented for managing users' rights to the digital documents managed by the systems. DRM systems can be used to protect various types of documents, such as .PDF (Portable Document Format), .DOC (Microsoft™ Word™), .XSL (Microsoft™ Excel™), .MSG (Microsoft™ Outlook™) files, etc.

In a current DRM system, each digital document is associated with a digital rights management policy that specifies which user has what rights to the document, as well as other parameters relating to access rights. Many such policies are stored in am RMS server (also called DRM server). The server stores a database table that associates each document (e.g. by a unique ID, referred to as document ID or license ID) with a policy (e.g. by a policy ID). Each digital document may also have metadata that contains the document ID. When a user attempts to access a document using an application program such as Adobe™ Reader, the application program contacts the RMS server to request access permission. The server determines whether the requesting user has the right to access the document in the attempted manner (view, edit, print, etc.), by determining the policy associated with the document and then referring to the content of that policy. The server then transmits an appropriate reply to the application program to grant or deny the access. If access is granted, the server's reply may contain a decryption key to decrypt the document.

Most current email systems use the MIME (Multi-Purpose Internet Mail Extensions) standard. In existing DRM protection for emails, typically one DRM policy is applied to the entire MIME format email document to control access permissions. In other words, if a MIME email is protected with a certain DRM policy, the digital documents that are attachments to the email are controlled by the same DRM policy as the email. In one example, U.S. Pat. No. 7,966,375 describes "a method for restricting access to one or more email attachments [which] includes receiving an email addressed to a first recipient and including at least a first attachment. The email is processed to determine whether a valid authorization code is associated with the email (and/or the attachment (s)). The valid authorization code identifies the email (and/or the attachment(s)) as an authorized communication. Access by the recipient to the first attachment is prevented if the processing of the email determined that no valid authorization code is associated with the email (and/or the attachment(s))." (Abstract.) U.S. Pat. No. 7,454,778 describes a method "for ensuring that sensitive subject matter within electronic messages is not inappropriately transferred between domains with differing security rights. [The method] utilizes the appropriate placement of message transfer agents or servers along with policy documents that include configurable semantics pattern recognition data for identifying deviant messages. Once deviant messages or messages that potentially have sensitive subject matter are identified, the present invention further provides for adaptable actions or remedies for ensuring that the sensitive subject matter is not inappropriately transferred between domains." (Abstract.)

SUMMARY

Embodiments of the present invention provides a DRM method that allows for different protection policies to be applied to different components of an email such as the email body (the message) and the attachments.

An object of the present invention is to provide more flexibility in DRM protection of emails and email attachments.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a digital rights management method implemented in a system including a client computer and a digital rights management server (RMS server) for protecting electronic mails (emails), which includes: by the client computer: (a) receiving encrypted data representing an email, the email including a message and one or more attachments, the data having been encrypted by an email application of the client computer based on an original digital rights management (DRM) policy selected by a user; (b) obtaining from the user one or more DRM policies to be applied to the attachments of the email, each attachment corresponding to one specified DRM policy; and (c) transmitting the encrypted data representing the email, along with data specifying the DRM policy to be applied to each attachment, to the RMS server; by the RMS server: (d) decrypting the encrypted data representing the email, including the message and the one or more attachments; (e) applying digital rights management protection to each attachment which has been decrypted, based on the DRM policy corresponding to the attachment as specified in the data received from the client, to generate a protected document for each attachment; (f) re-composing a email document which includes as attachments the protected documents for the attachments generated in step (e); (g) applying digital rights management protection to the re-composed email based the original DRM policy; and (h) transmitting the re-composed email document to an email exchange server.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exem-

DETAILED DESCRIPTION OF PREFERRED EMBODIMENTS

The description herein of the structures, functions, interfaces and other relevant features, such as digital rights policies, application programming interface (API) for rights management and policies, etc., of existing DRM systems may at times incorporates, references or otherwise uses certain information, documents and materials from publicly and readily available and accessible public information, e.g., "Rights Management" (URL http://help.adobe.com/en_US/livecycle/10.0/Overview/WS92d06802c76abadb2c8525912ddcb9a ad9-7ff8.html), "Programmatically applying policies (a subsection of 'Rights Management')", (URL http://help.adobe.com/en_US/livecycle/10.0/Overview/WSb96e41f8a4ca47a9-4882aeb5131190eddba-8000.html), "LiveCycle® ES Java™ API Reference" (URL http://livedocs.adobe.com/livecycle/es/sdkHelp/programmer/javadoc/index.html), etc. Another example of digital rights management system is Microsoft Active Directory Rights Management; some documentations for this system are available on line at: http://technet.microsoft.com/en-us/windowsserver/dd448611.aspx, http://msdn.microsoft.com/library/cc530389(VS.85).aspx, and http://msdn.microsoft.com/en-us/library/cc542552(v=vs.85).aspx.

While existing DRM protection systems for emails, which apply the same protection policy to the entire MIME email including the message (the body of the email) and attachments, provide consistent protection to the whole email, they can be inflexible and inconvenient in practical applications. In many practical scenarios, the user sending the email may wish to apply different protection policies to different components of the email. For example, the sender may wish to allow access to attachments by one set of users but to allow access to the email message by a different set (e.g., a larger set) of users; the sender may wish to allow access to attachments for one time duration and allow access to the email message for a different time duration; or the sender may wish to revoke access permission to attachments but not to the email message; etc. These protection scopes cannot be achieved with the existing DRM system for emails.

Further, while it may be possible to define DRM policies that will grant different access permissions to the email message and attachments, the number of DRM policies stored in the DRM system would need to be large to provide policies that will accommodate different combinations of access permissions for different attachments, which could reduce system performance.

Embodiments of the present invention provide a method for applying DRM protection to MIME emails that allows different components of the email, such as the message and the different attachments, to have different access permissions. This approach is referred to as "MIME-centric" in this disclosure.

Figure 1:
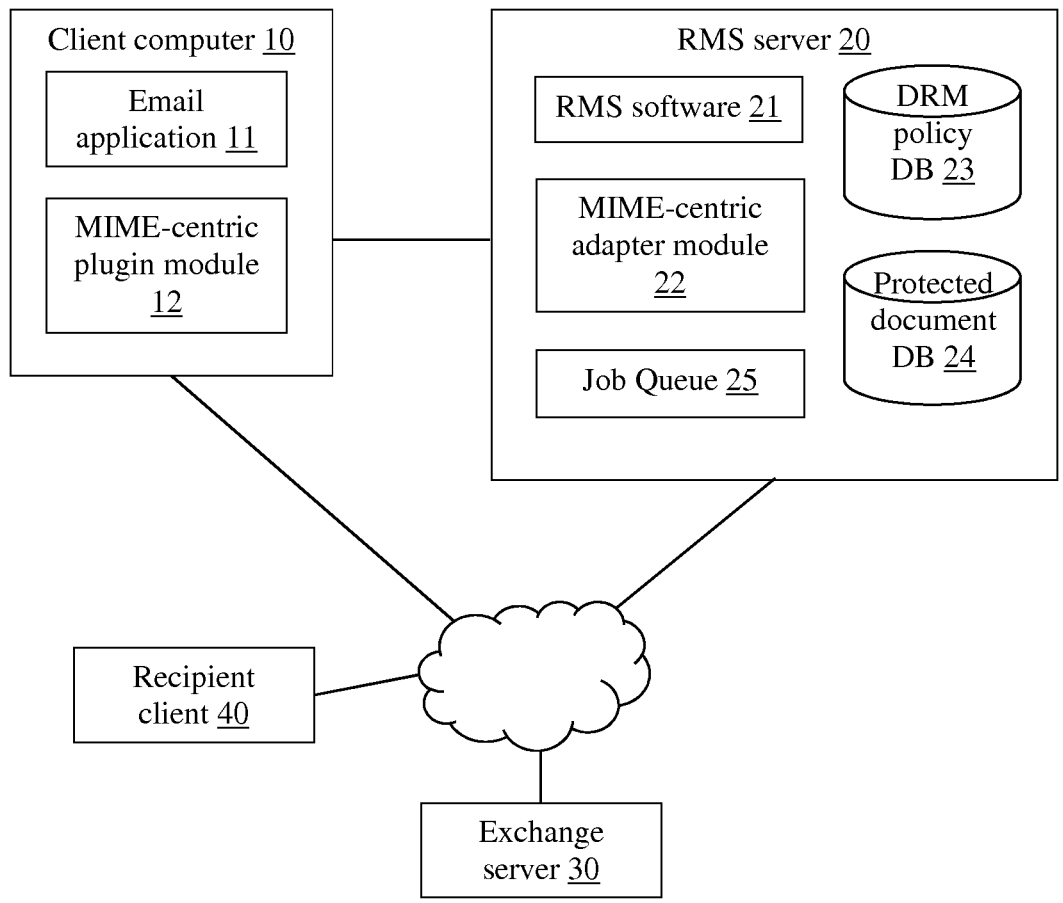
FIG. 1 schematically illustrates a data processing system which implements embodiments of the present invention.

FIG. 1 schematically illustrates a computer system which implements embodiments of the present invention. Each of the client 10, RMS server 20 and exchange server 30 is a computer having necessary hardware such as processor(s), memory(s), etc. (not shown in the drawings) and loaded with software application executed by the processor(s). Each application or software module of the computers includes software which can be executed by processor(s) to perform specified functions. The client 10, RMS server 20 and the exchange server 30 may be connected to each other via one or more networks such as the Internet or an intranet or other networks.

As shown in FIG. 1, the client computer 10 includes an email application program 11, which may be, for example, a known email application such as Microsoft™ Outlook™, Lotus™ Notes™, or any other suitable email application. The client 10 further includes a MIME-centric program module (a plugin) 12 which interacts with the email application 11. The MIME-centric plugin 12 works as a client to communicate with the RMS server 20. The RMS server 20 includes an RMS program module 21 that performs various digital right management functions, and a MIME-centric adapter program module 22 that interacts with the RMS module 21. The RMS server 20 further includes a DRM policy database 23 and a protected document database 24. The MIME-centric method according to embodiments of the present invention may be implemented by providing the plugin 12 in the client 10, without requiring any change in the email application 11; and providing the adapter module 22 in the RMS server 20, without requiring any change in the RMS module 21 and the DRM policy database 23 and protected document database 24 which may be provided by a conventional DRM system. The functions of the various components of the client 10 and RMS server 20 are described in more detail below. The exchange server 30, which is connected to an external network such as the Internet, performs known functions related to transmission of emails.

Figure 2:
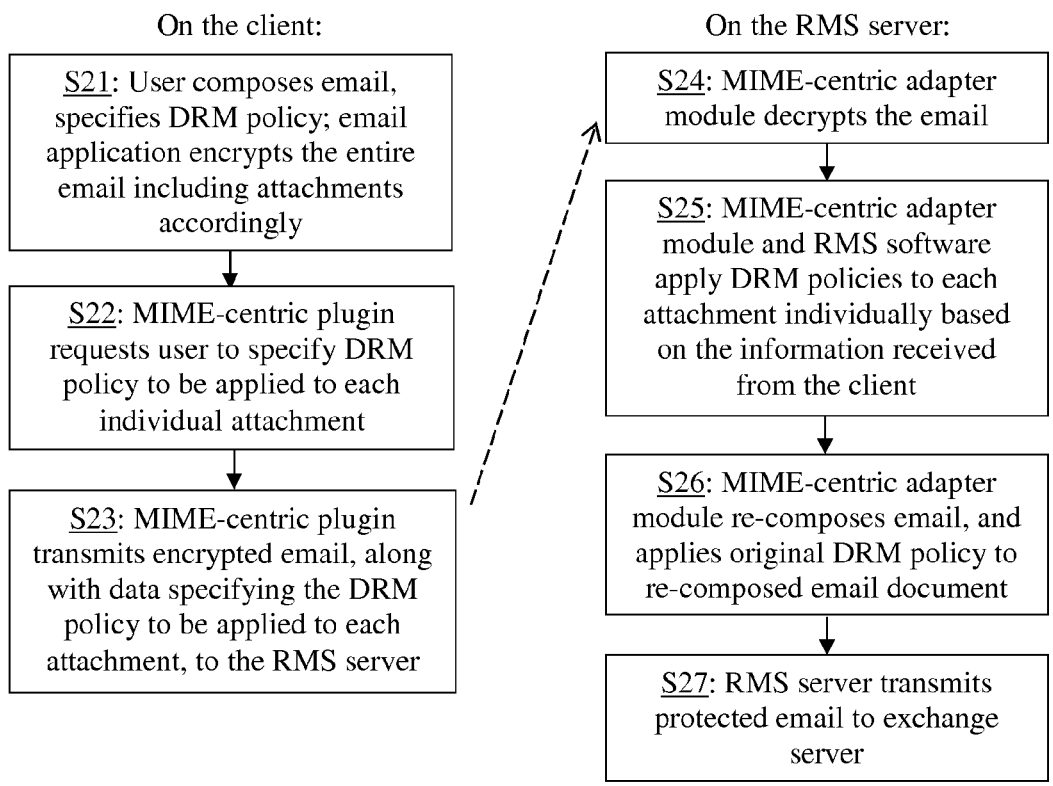
FIG. 2 schematically illustrates a DRM protection method for emails according to an embodiment of the present invention.

A DRM method according to an embodiment of the present invention is described with reference to FIG. 2.

When the user of the client 10 composes and sends an email using the email application 11, the user may specify a DRM policy to be applied to protect the email. The email application 11 encrypts the entire email document, including both the message and the attachments, according to the user-selected DRM policy (step S21). The specific actions of this step depend on the protection mechanism used by the DRM system. For example, in one embodiment, this step includes an exchange of data between the email application 11 and the RMS server 20. More specifically, the email application 11 transmits the DRM policy ID of the selected policy to the RMS server, the server generates a unique document ID and encryption key and supplies them to the email application 11, and the server also stores the document ID along with the policy ID and encryption key in the protected document databased 24, while the email application 11 performs encryption for the email document. In this step, the same DRM policy is applied to the entire email.

The MIME-centric plugin 12 intercepts the communication between the email application 11 and the exchange server 30, so that instead of being transmitted directly to the exchange server 30, the data of the email is processed by the MIME-centric plugin 12 first and then transmitted to the RMS server 20. The MIME-centric plugin 12 requests the user to specify the DRM policy to be applied to each individual attachment of the email, if they are to be different from the selected polity for the entire email (step S22). This may be done by using a user interface display generated by the plugin 12. The MIME-centric plugin 12 then transmits the email, which has been encrypted by the email application 11 according to the selected policy, along with descriptive data that specifies the DRM policy to be applied to each attachment, to the RMS server 20 (step S23). The data that specifies the DRM policy for each attachment may be in the JSON (JavaScript Object Notation) format or other appropriate formats.

After the RMS server 20 receives the email and associated data from the client 10, it is processed by the MIME-centric adapter module 22 and the RMS software 21 before being forwarded to the exchange server 30. A job queue 25 may be implemented in the RMS server 20 to queue the emails from the clients 10 while they await processing. As mentioned earlier, the entire email has been encrypted and protected by the same DRM policy. Thus, the first step is to remove the protection that has been applied to the entire email (step S24). The MIME-centric adapter module 22 decrypts the email document. If the email application 11 also added metadata into the email as a part of the DRM protection, the metadata will also be removed in this step.

Then, the MIME-centric adapter module 22 cooperates with the RMS software 21 to process each attachment individually, to apply the DRM policy specified in the descriptive data received from the MIME-centric plugin 12 (step S25). The specific actions of this step depend on the protection mechanism used by the DRM system. For example, in one embodiment, the RMS software 21 encrypts the attachment to generate an encrypted document, assigns a unique document ID to the document, embeds the document ID and other metadata in the document, and stores the document ID along with the associated DRM policy ID and encryption key in the protected document database 24. When applying the DRM policy, the RMS software 21 may need to consult the terms of the policy stored in the database 23.

After all the attachments are individually processed to apply the desired DRM policies, the MIME-centric adapter module 22 re-composes an email based on the decrypted email message generated in step S24, and applies the original DRM policy to the re-composed email document (step S26). Here, the DRM policy applied to the re-composed email document is the same as the polity that was applied to the email by the email application 11. More specifically, in one implementation, the re-composing process is as follows: The adapter module 22 creates a new email using the recipients (i.e. To, Cc, Bcc) specified in the original email, the subject line specified in the original email, and the original message body. The adapter module 22 may append a notification, such as additional text, to the message body to indicate (to the recipient) that the attachments may have been protected by different DRM policies than that applied to the message body itself. It then adds the protected attachments to the email, or links to the protected attachments that are stored in a remote storage medium. This results in a re-composed email document, such as a .msg file used by Microsoft™ Outlook™. The adapter module 22 then applies the original DRM policy, namely the policy that was originally selected for the email itself (note that this policy can be different from the policies for the attachments), to this re-composed email document. Again, the specific actions of applying a DRM policy to the file depend on the protection mechanism used by the DRM system; for example they may include the steps outlined in the preceding paragraph. The resulting email document has the same format according to the MIME standard as an email document generated by a conventional method, although the individual attachments now have been additionally applied with individual DRM policies.

The RMS server 20 then transmits the re-composed email, including the attachments, to the exchange server 30 (step S27). The RMS server 20 may include an SMTP client to perform this function. The exchange server 30 handles the email according to conventional technology to transmit the email to its recipients 40.

In the above-described process, the RMS server 20 need to first remove the original protection from the email (step S24) and then apply DRM protection to the email message and the attachments individually. This is because the email application 11 of the client 10 applies protection to the entire email; since the method describe here does not require any modification to the email application 11, the step of removing the original protection is needed if the email is originally protected by the email application 11.

After the email is received by a recipient 40, the email application or other application (such as a PDF reader application, a word processing application, etc.) on the recipient's computer 40 cooperates with the RMS server 20 according to conventional technology to enforce access control of the email. The access to the email message and each attachment can be controlled according to existing DRM technology. For example, in some DRM systems, the email application of the recipient 40 extracts the document ID from the encrypted email document, and transmits an access request, containing the document ID along with a user ID of the recipient and other relevant data, to the RMS server 20. The RMS server 20 determines the DRM policy ID associated with the document ID by referring to the protected document database 24, and determines the rights to be granted to the recipient user under the DRM policy by referring to the policy terms stored in the DRM policy database 23. The RMS server 20 then transmits an appropriate reply to the recipient 40 to grant or deny the access. If access is granted, the server's reply may contain a decryption key for the recipient 40 to decrypt the email message. The recipient 40 then displays the email in a conventional manner. For example, it may shown an icon to indicate each attachment. Then, when the user attempts to open or otherwise access an attachment, the attachment is processed by the appropriate applications such as Adobe™ Reader, etc. that opens the attachments. If the attachment has been individually protected in the manner described earlier, it will have its own document ID, and the RMS server will look up the protected document database 24 using that document ID to determine the access rights granted to that document. As a result, different DRM policies can be enforced for different attachments.

In an alternative embodiment, some parts of steps S24 to S27, i.e. the steps of decrypting the entire email, applying DRM policies to the email message and individual attachments, re-composing the email, and sending the email, can be performed by the MIME-centric plugin 12 on the client 10. For example, the RMS server 20 may perform the steps of generating unique document IDs and encryption keys for the documents to be protected and supply them to the plugin 12, as well as storing each document ID with the associated DRM policy ID and encryption key in the protected document database 24, while the MIME-centric plugin 12 performs the steps of decryption and encryption and re-composing of the email.

An advantage of the DRM methods of the present embodiments is that the different components of the email, i.e. the message body and the different attachments, can be protected with different DRM policies. This makes the system flexible and more user-friendly. It is achieved by a plugin module 12 on the client computer 10 and an adapter module 22 on the RMS server 20, without requiring modification of the email application 11 and the core RMS software 21.

It will be apparent to those skilled in the art that various modification and variations can be made in the DRM method of the present invention without departing from the spirit or scope of the invention. Thus, it is intended that the present invention cover modifications and variations that come within the scope of the appended claims and their equivalents.

What is claimed is:

1. A digital rights management method implemented in a system including a client computer and a digital rights management server (RMS server) for protecting electronic mails (emails), comprising:
   by the client computer:
   (a) receiving encrypted data representing an email, the email including a message and one or more attachments, the data having been encrypted by an email application of the client computer based on an original digital rights management (DRM) policy selected by a user;
   (b) obtaining from the user one or more DRM policies to be applied to the attachments of the email, each attachment corresponding to one specified DRM policy; and
   (c) transmitting the encrypted data representing the email, along with data specifying the DRM policy to be applied to each attachment and data specifying the original DRM policy, to the RMS server;
   by the RMS server:
   (d) receiving, from the client computer, the encrypted data representing the email, along with the data specifying the DRM policy to be applied to each attachment and the data specifying the original DRM policy;
   (e) decrypting the encrypted data representing the email, including the message and the one or more attachments, which has been received from the client computer in step (d);
   (f) applying digital rights management protection to each attachment which has been decrypted in step (e), based on the specified DRM policy for the attachment as specified in the data received from the client computer in step (d), to generate a protected document for each attachment;
   (g) re-composing an email document which includes as attachments the protected documents generated in step (f) to generate a re-composed email document;
   (h) applying digital rights management protection to the re-composed email document generated by step (g) based on the original DRM policy received from the client computer in step (d); and
   (i) transmitting the re-composed email document to an email exchange server.

2. The method of claim 1, wherein step (a) includes a plugin module on the client computer receiving the encrypted data representing the email from an email application on the client computer, wherein steps (b) and (c) are performed by the plugin module.

3. The method of claim 2, wherein in step (b), the plugin module obtains the one or more DRM policies from the user via a user interface generated by the plugin module.

4. The method of claim 1, wherein the data representing the email that has been decrypted in in step (e) includes recipients, a subject, a message body and the one or more attachments, and wherein step (g) includes:
   re-composing the new email document using the recipients, the subject and the message body; and
   attaching the protected documents, or links to the protected documents stored in a storage medium, to the new email.

5. The method of claim 4, wherein step (g) further comprises appending a notification to the message to indicate that the attachments and the message are protected by different DRM policies.

6. The method of claim 4, wherein the re-composed email document complies with Multi-Purpose Internet Mail Extensions (MIME) standard.

7. The method of claim 1, wherein step (f) includes, for each attachment:
   generating a unique document ID and an encryption key;
   encrypting the attachment using the encryption key;
   embedding metadata including the document ID in the encrypted attachment to generate the protected document; and
   storing the document ID in association with the DRM policy ID and the encryption key in a protected document database.

8. A computer program product comprising a first computer usable non-transitory medium having a first computer readable program code embedded therein for controlling a client computer, and a second computer usable non-transitory medium having a second computer readable program code embedded therein for controlling a digital rights management server (RMS server) computer,
   wherein the first computer readable program code is configured to cause the client computer to execute a process comprising:
   (a) receiving encrypted data representing an email, the email including a message and one or more attachments, the data having been encrypted by an email application of the client computer based on an original digital rights management (DRM) policy selected by a user;
   (b) obtaining from the user one or more DRM policies to be applied to the attachments of the email, each attachment corresponding to one specified DRM policy; and
   (c) transmitting the encrypted data representing the email, along with data specifying the DRM policy to be applied to each attachment and data specifying the original DRM policy, to the RMS server;
   wherein the second computer readable program code is configured to cause the RMS server to execute a process comprising:
   (d) receiving, from the client computer, the encrypted data representing the email, along with the data specifying the DRM policy to be applied to each attachment and the data specifying the original DRM policy;
   (e) decrypting the encrypted data representing the email, including the message and the one or more attachments, which has been received from the client computer in step (d);
   (f) applying digital rights management protection to each attachment which has been decrypted in step (e), based on the specified DRM policy for the attachment as specified in the data received from the client computer in step (d), to generate a protected document for each attachment;

(g) re-composing an email document which includes as attachments the protected documents generated in step (f) to generate a re-composed email document;

(h) applying digital rights management protection to the re-composed email document generated by step (g) based on the original DRM policy received from the client computer in step (d); and (i) transmitting the re-composed email document to an email exchange server.

9. The computer program product of claim 8, wherein step (a) includes a plugin module on the client computer receiving the encrypted data representing the email from an email application on the client computer, wherein steps (b) and (c) are performed by the plugin module.

10. The computer program product of claim 9, wherein in step (b), the plugin module obtains the one or more DRM policies from the user via a user interface generated by the plugin module.

11. The computer program product of claim 8, wherein the data representing the email that has been decrypted in in step (e) includes recipients, a subject, a message body and the one or more attachments, and wherein step (g) includes:

re-composing the new email document using the recipients, the subject and the message body; and attaching the protected documents, or links to the protected documents stored in a storage medium, to the new email.

12. The computer program product of claim 11, wherein step (g) further comprises appending a notification to the message to indicate that the attachments and the message are protected by different DRM policies.

13. The computer program product of claim 11, wherein the re-composed email document complies with Multi-Purpose Internet Mail Extensions (MIME) standard.

14. The computer program product of claim 8, wherein step (f) includes, for each attachment:

generating a unique document ID and an encryption key;

encrypting the attachment using the encryption key;

embedding metadata including the document ID in the encrypted attachment to generate the protected document; and storing the document ID in association with the DRM policy ID and the encryption key in a protected document database.

* * * * *